United States Patent [19]
Van De Grampel et al.

[11] Patent Number: 5,643,989
[45] Date of Patent: Jul. 1, 1997

[54] FIBER REINFORCED FUNCTIONALIZED POLYOLEFIN COMPOSITES

[75] Inventors: Hendrik T. Van De Grampel, Bergen Op Zoom, Netherlands; Yongsheng Hou, Pittsburgh, Pa.; Dennis O. Spencer, Shelby, N.C.; Robert G. Swisher, Pittsburgh; Thomas V. Thimons, Allison Park, both of Pa.

[73] Assignee: Azdel, Inc., Shelby, N.C.

[21] Appl. No.: 396,122

[22] Filed: Feb. 28, 1995

Related U.S. Application Data

[63] Continuation-in-part of Ser. No. 144,847, Oct. 29, 1993, abandoned.

[51] Int. Cl.$^6$ .............................. C08J 5/10; C08K 3/40; C08L 23/12
[52] U.S. Cl. ............... 524/494; 523/222; 524/495; 525/285; 428/902; 442/391; 442/393; 442/398
[58] Field of Search ............................ 428/902, 283, 428/285, 300, 441, 442; 523/222; 524/494, 495; 52/285

[56] References Cited

U.S. PATENT DOCUMENTS

| | | | |
|---|---|---|---|
| 3,437,550 | 4/1969 | Paul | 161/93 |
| 3,484,223 | 12/1969 | Vanderbilt et al. | 65/3 |
| 3,684,645 | 8/1972 | Temple | 161/141 |
| 3,713,962 | 1/1973 | Ackley | 161/154 |
| 3,850,723 | 11/1974 | Ackley | 156/180 |
| 3,883,333 | 5/1975 | Ackley | 65/2 |
| 4,248,935 | 2/1981 | Temple | 428/391 |
| 4,277,531 | 7/1981 | Picone | 428/228 |
| 4,278,720 | 7/1981 | Shannon | 428/109 |
| 4,335,176 | 6/1982 | Baumann | 428/228 |
| 4,358,501 | 11/1982 | Temple | 428/268 |
| 4,369,264 | 1/1983 | Baumann et al. | 523/209 |
| 4,704,423 | 11/1987 | Iwanami | 524/417 |
| 4,749,613 | 6/1988 | Yamada et al. | 428/286 |
| 4,755,575 | 7/1988 | Domeier | 526/313 |
| 4,882,229 | 11/1989 | Hwo | 428/461 |
| 4,943,607 | 7/1990 | Tanisake | 523/500 |
| 5,002,830 | 3/1991 | Gillis | 428/423.1 |
| 5,137,975 | 8/1992 | Kelusky | 525/263 |
| 5,165,990 | 11/1992 | Nakano | 428/288 |
| 5,219,913 | 6/1993 | Tomomatsu | 524/451 |

FOREIGN PATENT DOCUMENTS

| | | |
|---|---|---|
| 0404303 | 4/1991 | European Pat. Off. . |
| 0502414 | 7/1993 | European Pat. Off. . |

OTHER PUBLICATIONS

Adur, et al., Printed Proceedings of the SPI, 44th Annual Conference, Feb. 1989 Session 11–A, "Performance Enhanancement in Glass Fiber Reinforced Polyproplyene Obtained by the Addition of Acrylic Acid Grafted Polypropylene," pp. 1–5.

Constable and Adur, Printed Proceedings of the 1991 ANTEC, "Chemical Coupling of Glass–Filled Polypropylene Using Acid or Anhydride Modified Polpropylenes," pp. 1892–1896.

Elber, Sep./Oct. 1993 issue of *Plastic Design Forum*, "Polypropylene," pp. 58–62, 66.

PPG Industries, Inc., *Reinforced Plastics . . . By Design*, PPG Fiber Glass Reinforcements Market Series.

Takeuchi, Junji; Takimoto, Masahiro; *Chemical Abstracts*; "Fiber–Reinforced Propene Polymer Compsitions Containing Grey Pigment;" vol. 113, No. 16; Oct. 15, 1990; Abstract No. 133615; p. 60.

*Primary Examiner*—Paul R. Michl
*Assistant Examiner*—U. K. Rajguru
*Attorney, Agent, or Firm*—Ralph H. Dougherty; Christopher C. Dremann

[57] ABSTRACT

A composite material consisting of continuous random glass mats with a new non-peroxide sizing chemistry, polypropylene and a functionalized polypropylene. This composite gives unexpectedly higher performance in bumper beam applications. The functionalized polypropylene contains anhydride functionalities, which are preferably maleic anhydride.

66 Claims, 3 Drawing Sheets

FIBER REINFORCED FUNCTIONALIZED POLYOLEFIN COMPOSITES

CROSS REFERENCE TO RELATED APPLICATION

This application is a continuation-in-part of our U.S. patent application Ser. No. 08/144,847, filed Oct. 29, 1993 now abandoned.

FIELD OF THE INVENTION

The present invention relates to composite materials made from a polyolefin or polyolefins which have been chemically modified and reinforcing fibers which are laminated, not extruded, into a composite material.

BACKGROUND OF THE INVENTION

Polypropylene is a popular thermoplastic resin because it is lightweight, yet stiff, resistant to chemicals and heat, and can withstand repeated flexing. Equally important, polypropylene is less expensive than many other thermoplastics. As manufacturers look to new materials, polypropylene remains a front runner in thermoplastic applications. To improve strength, polypropylene has been reinforced with glass fibers. In automotive applications, polypropylene has been used for fan shrouds and battery cases. But, as government mandated fuel economy standards become more stringent, auto makers are looking for ways to reduce weight while simultaneously increasing the crash worthiness of their vehicles. One way companies are meeting the government and consumer mandates is by using polypropylene to replace metal and other plastics in automotive interiors and exteriors. This strategy has helped reduce both weight and cost while actually improving the recyclability of the vehicle.

Although polypropylene is known for its low cost and light weight, it has lagged behind metal and other plastic materials in terms of strength. While reinforcement with glass fibers can dramatically increase the strength and stiffness of polypropylene, its use in certain areas has been limited. Researchers have sought ways to further improve the properties of reinforced polypropylene. Despite glass fibers being an excellent source of reinforcement, a major drawback is attributed to the lack of interaction between the polar surfaces of the glass fibers with the non-polar polypropylene. The result is a very weak filler/polymer interface. After analyzing failures in composites of polypropylene and glass, it has been determined that the site of the failure is this weak interface. To combat this problem manufacturers have treated glass fibers, shortly after they are formed, with a composition, often called a size, which provides lubricating and protective properties to the fibers, and assists in providing strength and other properties to the reinforced polymers and the products made therefrom. These sizing agents help to hold the glass bundles and reduce surface polarity of the glass.

One area where reinforced polypropylene has not done as well as other plastics is in the area of automotive bumper beams. Traditionally, automotive bumpers have been made of metal, and until the low speed impact requirements were passed into law for the 1974 model year most bumpers were made of metal. Once the new standards were passed, manufacturers started looking for ways to meet these new requirements. An attractive alternative proved to be bumpers made of plastic. These new bumpers offered good protection from damage as well as having reduced weight and improved corrosion resistance.

Automotive manufacturers sought improved bumper material which is strong, light and can retain its shape even when large units are molded. Thermoplastics in the polyolefin family are a favorite with molders, especially polypropylene. However, when molded into a large piece such as a bumper beam or a fascia, polypropylene is not sufficiently stiff to withstand a 5 mph impact from a vehicle. Although polypropylene can be reinforced with glass fibers to improve its performance, even when reinforced, polypropylene falls short of meeting impact requirements demanded by auto manufacturers.

DESCRIPTION OF THE PRIOR ART

Applicants are aware of the following U. S. Patents and publications concerning composite materials that include polyolefins, chemically modified polyolefins and reinforcing fibers.

| U.S. Pat. No. | Inventor | Issue Date | Title |
|---|---|---|---|
| 3,684,645 | Temple | 08-15-72 | GLASS FIBER REINFORCED THERMOPLASTIC ARTICLE |
| 3,713,962 | Ackley | 01-30-73 | COMPOSITE MAT STRUCTURE |
| 3,850,723 | Ackley | 11-26-74 | METHOD OF MAKING A STAMPABLE REINFORCED SHEET |
| 3,883,333 | Ackley | 05-13-75 | METHOD AND APPARATUS FOR FORMING A UNIFORM GLASS FIBER CONTINUOUS MAT |
| 4,277,531 | Picone | 07-07-81 | HIGH STRENGTH FIBER GLASS REINFORCED THERMOPLASTIC SHEETS AND METHOD OF MANUFACTURING SAME INVOLVING A REVERSE BARB NEEDLING PROCEDURE |
| 4,278,720 | Shannon | 07-14-81 | BONDED MAT OF DIRECTIONALLY ORIENTED STRANDS AND RANDOMLY ORIENTED STRANDS |
| 4,335,176 | Baumann | 06-15-82 | BONDED NEEDLED FIBER GLASS THERMOPLASTIC REINFORCED MATS |
| 4,407,423 | Iwanami | 11-3-87 | PROCESS FOR PRODUCING MOLDED ARTICLE COMPRISING HYDROTALCITE, EVOH, AND OLEFIN RESIN |
| 4,755,575 | Domeier | 7-5-88 | PROCESS FOR PREPARING FIBER REINFORCED MOLDED ARTICLES |
| 4,882,229 | Hwo | 11-21-89 | BLENDS OF HIGH MOLECULAR WEIGHT POLYBUTYLENE WITH LOW DENSITY POLYPROPYLENE |
| 4,943,607 | Tanisake | 7-24-90 | FIBER-REINFORCED UNSATURATED POLYESTER |
| 5,002,830 | Gillis | 3-26-91 | FIBROUS REINFORCED MATERIALS IMPREGNATED WITH LOW VISCOSITY POLYURETHANES/ UREA FORMING COMPONENTS |

| | | | |
|---|---|---|---|
| 5,137,975 | Kelusky | 08-11-92 | METHOD FOR MANUFACTURE OF MODIFIED POLYPROPYLENE COMPOSITIONS |
| 5,165,990 | Nakano | 11-24-92 | STAMPABLE SHEET |
| 5,219,913 | Tomomatsu | 6-15-93 | POLYPROPYLENE-BASED RESIN COMPOSITION |

PAPERS

| Title | Author |
|---|---|
| CHEMICAL COUPLING OF GLASS-FILLED POLYPROPYLENE USING ACID OR ANHYDRIDE MODIFIED POLYPROPYLENES | R. C. Constable A. M. Adur |
| PERFORMANCE ENHANCEMENT IN GLASS FIBER REINFORCED POLYPROPYLENE OBTAINED BY THE ADDITION OF ACRYLIC ACID GRAFTED POLYPROPYLENE | Ashok M. Adur Robert C. Constable Joseph A. Humenik |
| POLYPROPYLENE REINFORCED PLASTICS . . . BY DESIGN | Gail Elber PPG Fiber Glass Reinforcements Market Series |

Temple, U.S. Pat. No. 3,684,645, teaches a glass fiber strand mat is combined with a thermoplastic resin containing short glass fibers to produce a thermoplastic resinous sheet which is reformable into various shapes by heat and pressure. The mat is formed of relatively long strands but disposed randomly so as to give uniform strength in all directions in the plane of the sheet. The relatively short glass fibers in the resin provide improved surface properties (roughness) as well as improved strength and heat resistance to the final product.

Ackley, U.S. Pat. No. 3,713,962, teaches fibrous mats comprised of unstranded filaments that are free to move relative to each other and fibrous mats comprised of fibrous strands that are free to move relative to each other, as well as combinations thereof, are impregnated with resin and subsequently molded into resinous products.

Ackley, U.S. Pat. No. 3,850,723, teaches fibrous mats comprised of unstranded filaments that are free to move relative to each other and fibrous mats comprised of fibrous strands that are free to move relative to each other, as well as combinations thereof, are impregnated with resin and subsequently molded into resinous products.

Ackley, U.S. Pat. No. 3,883,333, teaches a method and apparatus for forming a uniform continuous glass fiber mat is described employing a plurality of glass fiber bushings with attenuators pulling the fibers and depositing them onto a first conveyor. When one of the bushings ceases operation due to a breakout for example, a switch activates a timer activating a relay which causes a second conveyor receiving the mat from a first conveyor to reduce speed to compensate for the diminished amount of glass fibers being conveyed by the first conveyor. After the bushing that is down becomes operational, a switch activates a timer and a relay to effect an increase in the speed of the second conveyor to compensate for the increased amount of glass fibers being delivered by the first conveyor. Hence a uniform density glass fiber mat is produced.

Picone, U.S. Pat. No. 4,277,531, teaches a fiber glass reinforced thermoplastic laminant of high flexural strength and a method of preparing the laminant is described in which special needling of the fiber glass mat used as the reinforcement is undertaken to minimize damage to the strands making up the mat during needling while insuring that the strands are moved during needling of the mat to provide strands in the mat that are transverse through the long axis of the mat after needling. The mat upon completion of the needling is then laminated with a thermoplastic resin to produce a sheet product having improved tensile characteristics.

Shannon, U.S. Pat. No. 4,278,720, teaches a bonded mat which can be stretched over projections without excessive thinning out and which permits fiber loadings of greater than 25 percent by volume. The mat includes directionally oriented strands held together by swirled strands or randomly oriented fibers, and all of which are permanently held together by a binder.

Baumann, U.S. Pat. No. 4,335,176, teaches a stampable thermoplastic fiber glass reinforced product is shown which contains immediately below the resin surface on both major surfaces spikes of glass fibers integral with a mat. Utilization of the spikes with reference to the laminate surface produces laminates having improved stamping characteristics.

Iwanami, U.S. Pat. No. 4,704,423, teaches a process for producing a molded article comprising a mixture of an olefin resin, which includes: a residual chlorine due to a Zeigler type catalyst; a hydrolyzed ethylene-vinyl acetate copolymer and a hydrotalcite compound. This patent does not teach the use of glass fiber, polypropylene or functionalized polypropylene.

Domeier, U.S. Pat. No. 4,755,575, teaches an improved process for the rapid fabrication of fiber reinforced thermoset resin articles having improved mold release characteristics and curable molding compositions. While this patent teaches the use of fibers include fiber glass, it does not discuss a glass mat application. This patent mentions the use of anhydrides specifically maleic and phthalic anhydrides, however, their use is connected with polyester and not polypropylene. A careful reading of this patent shows that it is dealing with reaction injection molding which differs substantially from the remolding of the composite plaques used in the present invention. No reference to polypropylene is made.

Hwo, U.S. Pat. No. 4,882,229, teaches a heat sealable wrapping or packing film which is capable of forming a peelable seal. This patent is quite different from the invented process and the only note of interest would be the use of maleic anhydride to modify polyethylene. The present invention uses a modified polypropylene.

Tanisake, U.S. Pat. No. 4,943,607, teaches a fiber reinforced unsaturated polyester resin composite which, when processed, provides good molding. While this patent indicates that polypropylene can be used, a polyethylene is preferable. The reinforcing fiber can be a glass fiber and even a glass mat. No mention is made in this patent of the use a functionalized polypropylene resin.

Gillis, U.S. Pat. No. 5,002,830 deals with a reaction injection molding process which mentions the use of acid anhydrides as well as fibrous reinforcing material such as glass.

Kelusky, U.S. Pat. No. 5,137,975, teaches a method for the treatment of melt-grafted polypropylene to improve adhesive properties thereof. Molten grafted polypropylene is separated from an aqueous solution of an alkaline material and recovered in the form of pellets. The treated polymer may be used in adhesive formulations.

Nakano, U.S. Pat. No. 5,165,990, teaches a stampable sheet composition made from a styrene polymer and fibrous reinforcing material. This patent alludes to the use of a maleic anhydride modified polypropylene and the use of polypropylene in conjunction with glass fiber fed into a hot press is disclosed. Additionally glass fibers which are oriented parallel to one another, in one direction is disclosed were glass fibers had previously been defined to include sheet or mat preparation. Powder fillers are discussed, one of these being carbon black. While a number of individual points are mentioned there is no reference concerning the combination of these specific features into one composite or even that such a composite might be desirable.

Tomomatsu, U.S. Pat. No. 5,219,913 teaches a composition of polypropylene and talc powder and that this material is ideally suitable for an automotive bumper beam. It is noted that the polyolefins can be modified with maleic anhydride or acrylic acid. Further organic fillers other than talc, such as glass fibers can also be used. However the combination of polypropylene and talc, is specified as the preferred combination.

Constable and Adur in their article entitled CHEMICAL COUPLING OF GLASS-FILLED POLYPROPYLENE USING ACID OR ANHYDRIDE MODIFIED POLYPROPYLENES describe a composite produced by injection molding polypropylene, short chopped glass fibers and anhydride modified polypropylene. This heated extrusion process produces more intimate contact between the glass fibers and the thermal plastic. It does not discuss laminates and a continuous glass mat would be impossible to extrude.

Adur, Constable and Humenik in their article entitled PERFORMANCE ENHANCEMENT IN GLASS FIBER REINFORCED POLYPROPYLENE OBTAINED BY THE ADDITION OF ACRYLIC ACID GRAFTED POLYPROPYLENE describe a composite produced by injection molding polypropylene, short chopped glass fibers and a chemically modified polyolefin, an acrylic acid modified polypropylene. The heated extrusion process described in this article achieves a more intimate contact between the glass fibers and the thermal plastic. This article does not discuss laminates and a continuous glass mat would be impossible to extrude.

Elber gives some basic information about polypropylene in an article entitled POLYPROPYLENE. This reference's bearing on the invention only deals with some background basics of one of the compositions components.

The technical publication by PPG Industries, Inc., entitled Reinforced Plastics . . . By Design, PPG Fiber Glass Reinforcements Market Series, provides information regarding the value of fiber glass reinforced plastic as opposed to other materials.

SUMMARY OF THE INVENTION

The invention provides a composition of material that can be used for an automotive bumper beams, automotive seat backing or other formed parts. In its basic form, the composite is a glass mat with a functionalized polyolefin. The preferred composite includes polyolefin, functionalized polyolefin and a glass fiber mat or chopped glass fibers of at least a half inch in length.

OBJECTS OF THE INVENTION

The principal object of the invention is to provide an improved composite glass fiber and polyolefin sheet material.

A further object of this invention is to provide a composite material where the glass filaments don't have to be wetted out.

Another object of the invention is to provide a composite material which has superior dynamic strength.

Another object of the invention is to provide a composite material with superior strength which can be produced economically.

BRIEF DESCRIPTION OF THE DRAWINGS

The foregoing and other objects will become more readily apparent by referring to the following detailed description and appended drawings in which.

DETAILED DESCRIPTION

Figure 1:
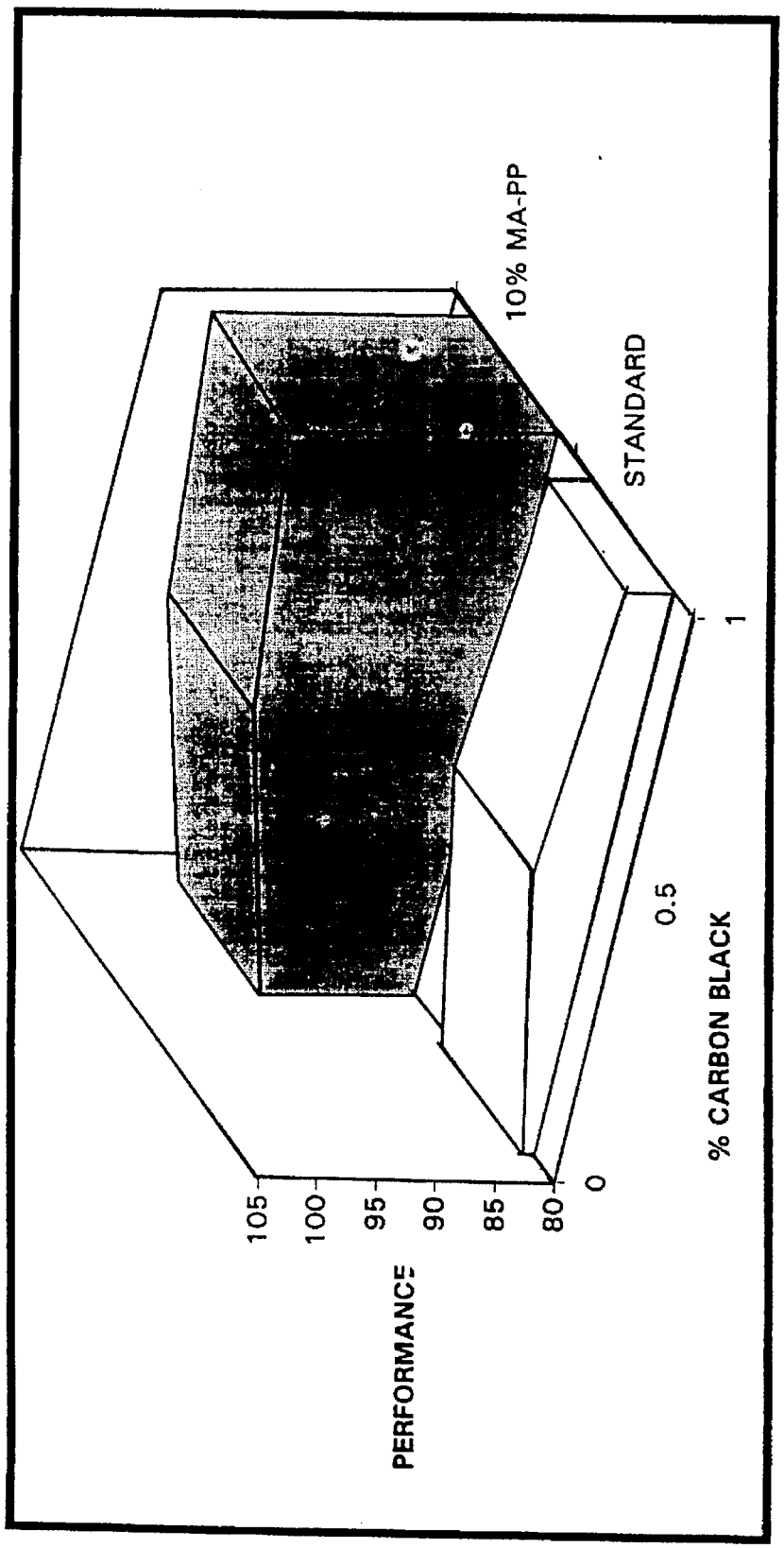
FIG. 1 is a graph that shows the increase in performance of carbon black over a composite without carbon black using polypropylene and a glass mat with and without functionalized polypropylene.
Figure 2:
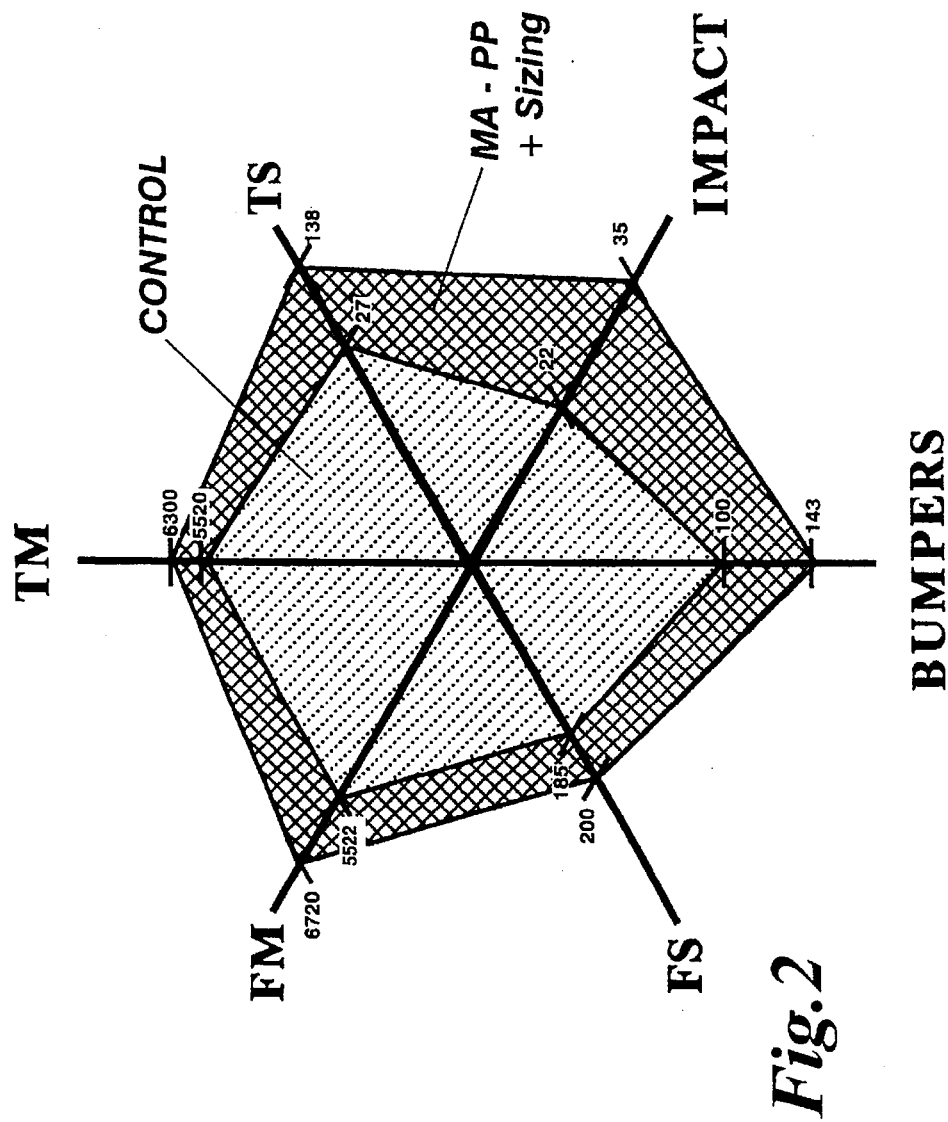
FIG. 2 is a graphical depiction of the increase in performance of a composite using both the functionalized polypropylene and new sizing over a control material using standard polypropylene and existing sizing technology.

The present invention relates to composites made from continuous random glass mats with polypropylene in conjunction with a functionalized polypropylene. Continuous random glass mats are prepared with fiber glass having a uniform fiber size (e.g. K or T). The terms "K" and "T" used in reference to fiberglass are designations of fiber diameter. The fibers are thirteen and twenty three microns, respectively. The fiber glass in the mat has been previously treated with a non-peroxide sizing.

The preferred aqueous size compositions for application to glass fibers for use in the invention contain, as essential components, a reaction product of a polymeric amine and an amine-reactable organosilane, a film-forming polymer and an emulsified polyolefin. The reaction product can be preformed or made in situ, and is preferably the product of a polyalkylene polyamine and epoxy-functional alkoxysilane.

The reaction product can be obtained from a wide variety of polymeric amines and organosilanes, provided the polymeric amine contains at least two and preferably three or more reactive amine groups, normally free primary or secondary amine groups, and the organosilane contains at least one amine-reactable group.

The preferred polymeric amines are those of the formula

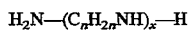

where n is 2 to 6 and x is 2 to 28, preferably 2 to 6. Such polyalkyleneamines include diethylenetriamine, triethylenetetramine, tetraethylenepentamine, pentaethylenehexamine, dipropylenetriamine, tripropylenetetramine, tetrapropylenepentamine, pentapropylenehexamine, and dihexamethylenetriamine. Mixtures of these are also suitable and in many cases the polyalkyleneamine is chain-extended in the manner discussed below.

Among other polymeric amines which can be usefully employed in the reaction product are polyamines containing fatty acid moieties, polyamine-polyamides, acylated polyamines and other amidoamine polymers, condensation products of polyalkylamines with polyfunctional acids, and polyalkyleneimines.

The polymeric amine component may also be chain-extended variations of the foregoing, such as those produced by reacting the polyamine with difunctional materials which are reactive with amine groups to provide predominantly linear compounds of increased molecular weight. Compounds containing carboxyl, ester, epoxy, isocyanates, halo or other moieties reactive with amine groups, and especially diesters, diepoxies and diacids, can be used in this manner to effect chain extension.

A specific preferred polyamine is tetraethylenepentamine chain-extended with diethyl succinate and octanoic acid to a molecular weight of about 1500, sold as "Alubraspin 230" by PPG Industries, Inc.

The organosilane which is reacted with the polymeric amine to form the reaction product used herein is most commonly an epoxy-functional alkoxysilane, i.e. a silane having at least one epoxy-functional organic moiety and up to three alkoxy groups. The hydrolysis product of the alkoxysilane, in which the alkoxy groups are at least partially hydrolyzed to hydroxyl groups, can also be used and is often preferred, although the hydrolysis is best carried out just prior to the reaction with the polymeric amine. While alkoxy (or hydroxy) substituted silanes are readily available and are preferred, any organosilane that has at least one amine-reactable group, i.e. a group which reacts with the amine groups of the polymeric amine, can be used. The amine reactable group is preferably an epoxy group, but compounds containing amine-reactable keto groups, isocyanato groups, ester groups, alkylhalo groups, acryloxy groups, and the like, may also be employed.

The preferred class of organosilanes herein can be represented by the formula

$$R_n\text{—Si(OR}^1)_{4-n}$$

where R is the amine-reactable group, $R^1$ is alkyl (preferably lower alkyl), or hydrogen (in the case of a hydrolysis product), and n is preferably one but may be 2 or 3. Some specific useful organosilanes are:

gamma-glycidoxymethyltrimethoxysilane
delta-glycidoxybutyltrimethoxysilane
3,4-epoxycyclohexylethyltrimethoxysilane
3-(isocyanato)propyltriethoxysilane
gamma-isocyanatopropyltriethoxysilane
gamma-methacryloxypropyltrimethoxysilane
gamma-acryloxypropyltriethoxysilane.

The proportions of polymeric amine and organosilane used to make the reaction product are usually from 0.1 to 25 moles of silane per mole of polymeric amine; preferably, the ratio provides for about one mole of organosilane per 1500 number average molecular weight of polymeric amine.

The reaction product can be preformed by mixing the polymeric amine and organosilane, with heating if desired to increase the rate of reaction. A solvent is not necessary unless the viscosity of the reactants is excessive, in which case an alcohol or water can be added. Alternatively, and usually preferably, the reaction product can be formed in situ, i.e. by including polymeric amine and organosilane in the treating composition. In this case, they react during the formulation and/or during application of the composition to the fibers and the subsequent drying.

The second component of the composition is a film-forming polymer. Film formers have been conventionally used in sizes for glass fibers; for example, starch-oil sizes are well known for application to glass fibers for textile use (i.e. for use in woven fabric or cloth). In the present invention, starch is not utilized as a film former.

The film-forming polymer component herein is usually of relatively low molecular weight. A wide variety of film-forming polymers are known and can be used. The preferred polymers are epoxies, by which is meant compounds or mixtures of compounds having more than 1.0 epoxy groups per molecule. These include polyglycidyl ethers of polyphenols, such as bisphenol A, or of polyhydric alcohols; cycloaliphatic polyepoxides; polymers containing pendent epoxy groups, such as polyglycidyl acrylate; and the like. The preferred epoxies are commercially available products, particularly polyglycidyl ethers of bisphenol A, these often have been modified to provide additional functionality, as by reaction with urethanes to include isocyanato groups. The specific preferred film forming polymer is the epoxy resin sold by Rhone-Poulenc as Epi-Rez W60 5520, which is a modified epoxy resin dispersion in water (56% solids). The epoxy resin is understood to be a urethane-modified polyglycidyl ether of bisphenol A having an epoxide equivalent of 520.

Also useful as the film-forming polymer are other synthetic polymers made from various monomers and which, when dried or cured, form a surface film. Examples include polyvinyl halide polymers, acrylic polymers, urethanes, alkyds, aminoplasts, vinyl acetate polymers and copolymers, poly(vinylpyrrolidone), polyesters, and the like.

The composition also includes an emulsified polyolefin, i.e., a stable dispersion of polyolefin in water. Preferred is emulsified polypropylene. Emulsions of polyolefins such as polyethylene and polypropylene are available commercially and are employed in the practice of the invention. Preferred emulsions are those of polypropylene which have been modified to introduce polar groups, as for example, by free-radical induced grafting ethylenically unsaturated monomers, such as maleic anhydride or acrylic acid. Usually, the level of such polar groups is quite low, in the rage of 0.01 to 1 percent by weight. For instance, commercially available maleic anhydride-modified polypropylene emulsions usually contain about 0.1 percent by weight of maleic anhydride. A specific preferred polyolefin emulsion is sold by National Starch and Chemical Company as Protolube RL-5440, and is a maleic anhydride modified polypropylene emulsion containing 32 percent solids. Other examples of useful emulsified polyolefins include several products sold by Chemical Corporation of America including those sold as Poly Emulsion 43N40, which is a non-ionic polypropylene emulsion, and Poly Emulsion 43C40, which is a cationic polypropylene emulsion, each of these having about 40 percent solids content.

An optional added component is a water-soluble, non-volatile carboxylic acid. "Non-volatile" is defined as a material which does not substantially volatilize at the conditions at which the composition is made and applied. "Water-soluble" is defined as a soluble in water in the concentration utilized in the composition. Both of these terms being used in the sense conventional in the art. Unsaturated acids, such as maleic acid, are preferred, but others such as benzoic acid, oxalic acid, butyric acid, methacrylic acid and the like can also be employed. The carboxylic acid component, while not critical, is important in achieving the desired level of properties in fabricated products made using the glass fibers treated with these compositions along with thermoplastic polymers such as polypropylene.

While the treating composition usually consists essentially of the foregoing components, other additives can be included. These may include such materials as surfactants and low molecular weight acids, such as acetic acid, used to adjust the pH, which is usually between about 3 and about 9, preferably between about 5 and 6.

Glass fibers treated with the foregoing size composition can be made into mats in accordance with known practice. Such mats, especially continuous strand needled mats, are particularly useful for making the reinforced thermoplastic polyolefin resin sheets of the present invention. These preferred size composition for glass fiber treatment, are more fully described in co-pending application Ser. No. 08\146,267, filed the same day herewith.

The functionalized polypropylene is prepared with maleic anhydride. While it is possible to use different materials in the functionalization of polypropylene, maleic anhydride is preferred because its works well and is low in cost. Basically, the functional group incorporated in the polypropylene chain is a 5 membered ring. Position 1 of the ring contains an oxygen atom attached to a carbonyl carbon at position 2 which is attached to two more carbon atoms at positions 3 and 4 and finally to another carbonyl carbon at position 5.

functionalized polypropylene increases the performance of the composition. This level can be increased to 5% on weight. The optimal range is between 0.02% and 0.15% based on the final composition. This level can be achieved in two ways. Either add polypropylene with the desired level of functionalization directly to the glass mat, or mix polypropylene with a highly functionalized polypropylene so that the end product will average out to the desired level of functionalization and add the blended mix to the glass mat.

When polypropylene is blended with functionalized polypropylene it is easier to let down a small quantity of functionalized polypropylene into the standard polypropylene. Therefore, a higher degree of functionalization is desirable. It is now common in the industry to have 0.2% to 0.3% functionalized polypropylene. While polypropylene of this level of functionality can be used, it is preferable to use polypropylene with an anhydride functionality in the 0.8% to 1.6% range. Of importance is that at the 0.8% level of functionality there is no real difference in cost compared to material with a functionality in the 0.2% to 0.3% range. However, to obtain polypropylene with an anhydride func-

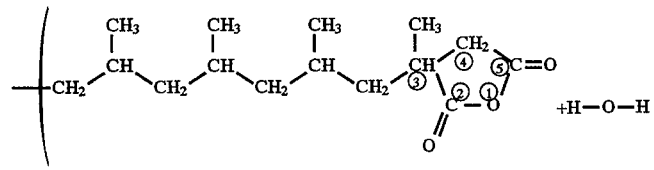

If any water is introduced into this system, it will have the tendency to cleave the ring between the oxygen atom (position 1), and one of the carbonyl carbons (either position 2 or 5). The water molecule will give up a positively charged hydrogen ion which will attach to the now negatively charged oxygen atom at position 1. This will leave the other carbonyl carbon with a positive charge (see position 5). When the water molecule gave up a positive hydrogen proton it left a negatively charged OH ion, which is then attracted to the positive charge on the carbonyl carbon.

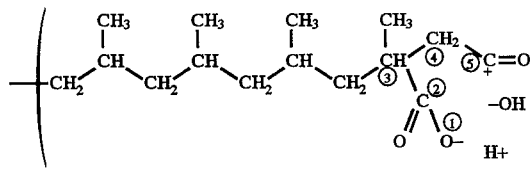

The result is that the ring is split and two carboxyl groups are formed. There is no indication that the anhydride or a compound containing two carboxyl functional groups differ any in performance.

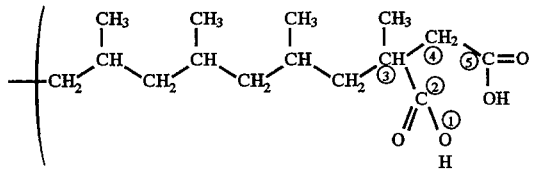

What is important on the functionalized polypropylene is the number of functional groups that are contained in the polypropylene. This is generally measured in a weight/percent manner. Testing has shown that a level of functionalization of at least 0.02% based on the weight of the tionality of 1.6%, the cost increases. This is generally due, not to the cost of raw materials, but rather to the processing cost involved in achieving the higher anhydride functionality. Further, material having a 1.6% anhydride functionality on the polypropylene is priced as a value added commodity.

The other important factor to consider in the selection of the polypropylene is the melt flow. Polypropylenes possessing a higher melt flow can be molded more easily while reducing energy costs to the purchaser of the material.

Figure 3:
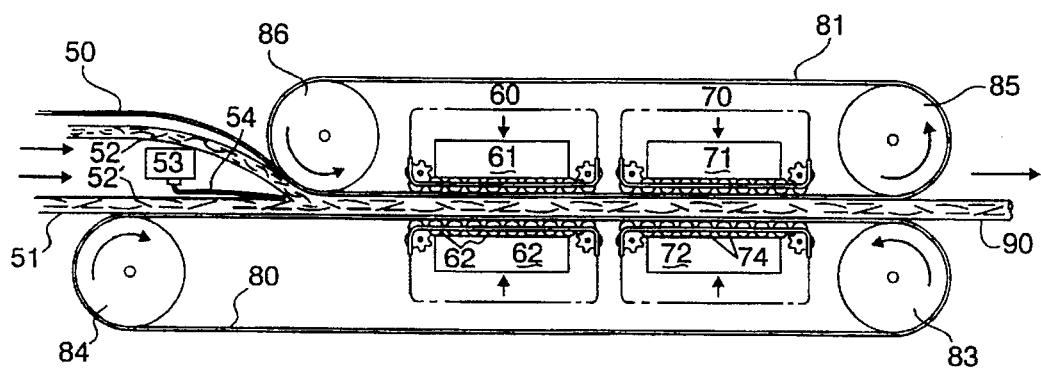
FIG. 3 is a diagrammatic illustration of equipment laminating mat products with thermoplastic resin to produce superior thermoplastic resin sheets.

In FIG. 3, an illustration of equipment is shown suitable for laminating the continuous mat products produced in accordance with the instant invention with thermoplastic resins sheets to produce superior thermoplastic resin products in accordance with this invention. Thus, as shown in the drawing two thermoplastic resin sheets 50 and 51 are fed to a first laminating zone generally indicated 60. Fed in between the two resin sheets 51 and 50 are two needled mats prepared in accordance with this invention and identified by the numerals 52 and 52'. Intermediate the mats 52 and 52' fed from extruder 53 is a molten thermoplastic resin 54 of composition typically identical to the composition of the thermoplastic resin sheets 50 and 51. The resin sheets 50 and 51 and the mats 52, 52' and the molten resin 54 are passed into the hot laminating zone 60 by belts 81 and 80 respectively as they pass over rollers 84 and 83 and 85 and 86 respectively. The belts are moved through the zone utilizing the sprocket drives 63 and the roller members 64 associated therewith to drive the belts through the machine. The product emanating from the hot zone 60 is passed into a cold zone 70 operated at cooler temperatures than the hot zone 60 where the belts 81 and 82 are moved continuously again utilizing the sprocket members 73 and associated rollers 74 to move the belt in a continuous straight line fashion through the cold zone. In the hot zone platen pres members 61 and 62 are utilized to apply pressure to the mats 52 and 52' and the associated thermoplastic resin sheets 50, 51 and the thermoplastic molten resin 54 during their passage through the zones. Similarly in the cold zone, platen press members 71 and 72 apply pressure to the laminant during its passage through that zone. The pressures applied in both zones are preferably equal although pressure can be varied in each zone to independently to apply greater or lesser pressures in one zone than the other. Upon cooling in the laminating zone 70 the finished sheet product 90 is removed and may then be utilized as a final product material.

Figure 4:
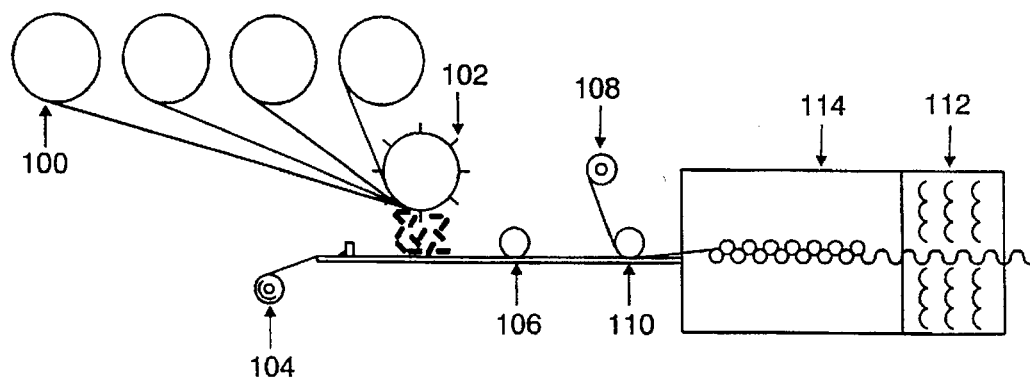
FIG. 4 is a diagrammatic illustration of equipment laminating long chopped fiber products with thermoplastic resin to produce superior thermoplastic resin sheets.

In continuous panel manufacture, roving 100, FIG. 4, is chopped 102 onto a film of resin 104 which has been doctored onto and is supported by a cellophane or other suitable carrier sheet. The sheet is first passed through kneading devices 106 to eliminate entrapped air, then is covered with a second sheet 108 and passed through squeeze rollers 110 to establish closely controlled, finished panel thickness. Finally the laminate passes through a curing oven 112 operating at a temperature 200° to 300° F., which may contain shaping rollers 114 for corrugations. Panels are then stripped of the carrier sheets and cut to length.

Temperature of the thermoplastic resins prior to lamination are in the range of 370° F. to 450° F. core temperature, with a preferred core temperature of 400° F. The laminating apparatus usually exerts between ½ to 6 bar of pressure or 7 to 90 pounds per square inch pressure with the preferred range being 20 to 30 pounds per square inch.

The laminated composite of the present invention consisting of layers of glass mat and functionalized polyolefin resin. Typically there would be five layers, see FIG. 3. Functionalized polyolefin such as functionalized polypropylene (hereinafter f-PP), (f-PP) 50: Glass mat 52: f-PP 54: Glass mat 52': f-PP 51. These layers would be laminated using high pressure and temperatures above the melting point of the resin. The pressures for laminating can be obtained using a stationary platen press or continuous belt press.

Alternative lamination structures include: a three layer structures, f-PP, Glass mat, f-PP; a five layer structure consisting of a polyolefin, glass, f-PP, glass, polyolefin; and a six layer structures consisting of f-PP, glass, f-PP, polyolefin, f-PP, glass, f-PP. Laminates of greater than six layers can also be considered, which increases the permutations of polyolefin, functionalized polyolefin and glass mat combinations. The layers of polyolefin resin can be considered to be applied in several forms, including but not limited to pellets, flake, powder, extrudate or film.

After the composite product is produced, it is pre-cut into sheets called blanks. These blanks are pre-heated to a temperature just above their softening point. This is typically done with infra-red heaters in a holding apparatus which is connected to a modified mechanical stamping press. Softened blanks are then charged to an open, cooled matched metal die mounted in the press. The die is then rapidly closed and the press is stopped on the bottom for 5 to 15 seconds to allow for cooling of the laminate, the press is then opened and the part is removed. Relatively complex isotropic parts requiring no trimming can be shaped at very high production rates in one die. This compares favorably with steel stampings which would generally require several "strikes" in multiple dies and presses to stamp a comparable part.

ALTERNATIVE EMBODIMENTS

While the present invention relates to composites made from continuous random E-glass mats (borosilicates) it is possible to further increase performance of the material by adding in unidirectional reinforcing strands of glass.

The use of Carbon Black has been shown to significantly increase the performance of the composite requiring less functionalized polypropylene be used, see FIG. 1. This is a surprising finding. It had been expected that the addition of carbon black, a pigment, would at best cause no change in performance and at worst, result in a drop in performance. In theory, the pigment is dispersed in the polypropylene film, like the glass fibers. This dispersion of pigment in the film gives the composite color. However the pigment is thought to be inert, so that it is only trapped by the composite. While it is possible to use up to 20% or even 30% carbon black in the composite, the preferred range is between 0.01% to 5% carbon black.

While a glass mat, such as E-glass mat, is preferred, it is also possible to use chopped glass fibers of at least a half (½) inch in length treated with non-peroxide sizing, more specifically an aqueous composition of a polymeric amine and amine-reactable organosilane, along with a film-forming polymer, an emulsified polyolefin and a non-volatile carboxylic acid as described in copending application Ser. No. 08\146,267, filed the same day herewith. The combination of these fibers with carbon black, polypropylene and functionalized polypropylene creates a composite material of superior performance.

While polypropylene is mentioned extensively throughout this application, it should be readily apparent to anyone of ordinary skill in the art that derivatives of polypropylene, as well as polyethylene and derivatives of polyethylene, can be used and can have functionalization added to prepare a laminated composite of superior performance characteristics.

The present invention shows significant improvement in the DYNATUP instrumental impact test and in both static and dynamic crash tests. In materials made in accordance with the present technology, chopped fiber polypropylene composites typically show a DYNATUP instrumental impact strength of 8 to 10 foot pounds, whereas glass mat reinforced thermoplastic (GMT) made with polypropylene normally exhibit a DYNATUP impact strength of 14 to 16 foot pounds. The DYNATUP Instrumented Impact test can be described more accurately by referencing the ASTM (American Standard Test Method) method. The term "DYNATUP" is actually a trade name for an instrument that can perform the test. ASTM D6738 is referred to as "Standard Test Method for High-Speed Puncture Properties of Plastic Using Load and Displacement Sensors". In the field of automotive bumper beams, a person of ordinary skill in the art would be more likely to refer to this test as a "DYNATUP Test" rather than the ASTM D6738, although that person, in using the DYNATUP reference, would immediately know that the test which was being discussed would be the ASTM D6738. Applicants have discovered that through the addition of the invented glass sizing and the use of the functionalized polyolefin, such as polypropylene or polyethylene, that the composite material made of chopped fibers exhibits a DYNATUP strength equal to the GMT materials in a range of 14 to 16 foot pounds and that the glass mat material generally exhibits a DYNATUP impact strength of at least 18 foot pounds.

Table 1 shows a test result where a laminated glass mat product, having a forty percent (40%) glass content, and polypropylene showed a DYNATUP impact of 16 foot pounds while the laminated composite using the same forty percent (40%) glass mat where the glass mat was treated with the invented sizing chemistry and the polypropylene included the functionalized polypropylene showed a DYNATUP impact strength of 29.2 foot pounds, which is an improvement in excess of eighty percent (80%). Tests on vehicle bumper beams have been equally encouraging, generally showing better than a twenty percent (20%) improvement in performance between bumper beams which were treated with the invented glass sizing chemistry and the functionalized polypropylene over bumper beams using the existing sizing and using polypropylene without any functionalization. The generic designed bumper beam was simply a beam that has a C-cross section configuration and is representative of a beam which might be used on a midsize automobile. The domestic van testing used a beam design from a Chrysler Minivan, such as the Dodge Caravan.

The prior art teaches that when low levels of maleated polypropylene are added in a glass reinforced composite that there is a reduction in impact strength. This has been shown through notched Izod tests in composites using polypropylene glass reinforcement and between zero and one percent of maleated polypropylene. Surprisingly, Applicants have found that the addition of 0.08 percent of maleated polypropylene in their invented composite material does not create an appreciative difference in the notched Izod value as shown in Table 6.

EXAMPLES

Material samples were prepared, an E-glass mat and polypropylene composite serving as a control against sample A, a composite of polypropylene, functionalized polypropylene and E-glass mat. When tested for Tensile Strength, Tensile Modulus, Flexural Strength and Flexural Modulus, sample A showed improvements in all areas (see table 1) but Tensile Modulus. What was completely unexpected was the significant increase in performance when tested for impact. The impact tests were run on a DYNATUP machine and showed an 83% increase in performance over the control sample which did not use the functionalized polypropylene.

TABLE 1

MECHANICAL PROPERTIES

| PROPERTY | units | CONTROL | A | % IMPROVEMENT |
|---|---|---|---|---|
| % GLASS | % | 40 | 40 | |
| TENSILE STRENGTH | ksi | 14.0 | 19.8 | 41 |
| TENSILE MODULUS | ksi | 800 | 800 | — |
| FLEXURAL STRENGTH | ksi | 24.0 | 29.6 | 23 |
| FLEXURAL MODULUS | ksi | 800 | 900 | 13 |
| IMPACT | ft-lbs | 16.0 | 29.2 | 83 |

A sample plaque was then prepared with carbon black, polypropylene, functionalized polypropylene and E-glass mat, sample B. The expectation was that the addition of carbon black would result in the same or slightly worse performance than the control. However the addition of carbon black actually resulted in an increase in performance of the plaque over both the control and sample A. Sample B showed a 14% improvement in Tensile Modulus and a 8% improvement in Flexural Modulus as shown in Table 2.

TABLE 2

EFFECTS of CARBON BLACK

| PROPERTY | units | CONTROL | A | B | % IMPROVEMENT |
|---|---|---|---|---|---|
| TENSILE MODULUS | ksi | 800 | 800 | 914 | 14 |
| FLEXURAL MODULUS | ksi | 800 | 900 | 974 | 8 |
| CARBON BLACK | Y/N | NO | NO | YES | |

Based on this testing Bumper Beams were molded with the control composite and with a composite using maleated polypropylene carbon black and the new sizing chemistry on the glass mat. In all cases the bumpers showed a 20 to 60 percent improvement in static and dynamic 5 mph crash tests.

TABLE 3

BUMPER BEAM PERFORMANCE

| | Test | Max. Load (lbs.) | | % Improvement |
|---|---|---|---|---|
| Design | Type | Standard | MA-PP | |
| Generic | static | 4,500 | 6,800 | 51 |
| Domestic, Van | static | 8,000 | 9,800 | 23 |
| Domestic, Sedan | static | 13,000 | 15,700 | 21 |
| Foreign, Sedan | static | 5,100 | 6,900 | 35 |
| Domestic, Van | 5 mph. | 21,000 | 33,700 | 60 |
| Domestic, Sports | 5 mph. | 12,200 | 17,300 | 42 |

MA-PP stands for maleated polypropylene

Samples were prepared with and without carbon black, with and without functionalized polypropylene, polypropylene, a 30% glass mat with existing sizing technology and with the new sizing technology. The results are listed in Table 4 below. The addition of the new sizing technology demonstrated an appreciable difference in performance even without the functionalized polypropylene as can be seen by comparing the control with sample H. By removing the carbon black but adding functionalized polypropylene, sample I shows a decrease in all areas compared to sample H which contained carbon black and the new sizing. Though sample I demonstrates improvements over the carbon black control without the sizing. The sample containing carbon black, new sizing and functionalized polypropylene produced improved performance in every area.

TABLE 4

30% GLASS FILLED EXPERIMENT

| PROPERTY | units | CONTROL | H | I | J |
|---|---|---|---|---|---|
| TENSILE STRENGTH | ksi | 12.0 | 12.5 | 12.0 | 13.4 |
| FLEXURAL STRENGTH | ksi | 20 | 23 | 22 | 25 |
| FLEXURAL MODULUS | ksi | 620 | 806 | 747 | 853 |
| CARBON BLACK | Y/N | YES | YES | NO | YES |
| MA-PP | | NO | NO | YES | YES |
| New Sizing | | NO | YES | YES | YES |

MA-PP stands for maleated polypropylene

Applicants are aware that functionalized polypropylene combined with glass fiber reinforcement are known in the art. However, what has been taught to date is the combination of functionalized polypropylene with short chopped fibers in an injection mold. The use of long chopped fibers, which are defined here to be fibers of at least one half (½)

inch in length, or a glass mat significantly increases the notched Izod impact strength of the composite, as can be seen in Table 5.

TABLE 5

IMPACT STRENGTH (ft lbs/in)

Data for 40% Glass filled polypropylene

| Short Chopped | Long Chopped | Continuous Mat | Mat MA-PP New Sizing |
|---|---|---|---|
| Continuous Injection Molded | | | |
| | | ← Compression Molded → | |
| 2 | 10 | 14 | 16 |

MA-PP stands for maleated polypropylene

The main product is composed of 0.08% Maleated Polypropylene. When comparing the Notched Izod data of the two products using a continuous mat, of the Patent Application, Ser. No. 08/144,847, there is little difference in the Notched Izod values, as can be seen in Table 6.

TABLE 6

| | CONTROL | MA-PP |
|---|---|---|
| Notched Izod (ft-lbs/in) | 14.0 | 14.3 |

This is not considered a significant difference and certainly is not a drop in performance. The fact that this particular property is unaffected by the addition of the Maleated Polypropylene is unexpected, since all the other properties are increased significantly. Thus it is clear that the behavior of the product of the present invention is unique.

SUMMARY OF THE ACHIEVEMENT OF THE OBJECTS OF THE INVENTION

From the foregoing, it is readily apparent that we have invented an improved composite material which is especially suited for the production of automotive bumper beams. The combination of continuous random glass mats, with a new non-peroxide sizing chemistry, polypropylene and a functionalized polypropylene contained anhydride functionalities have shown to give unexpectedly higher performance in bumper beam applications.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A composite material comprising:
    a glass mat comprising a plurality of glass fibers treated with a reaction product of a polymeric amine and an organosilane, a film-forming polymer and an emulsified polyolefin; and
    a functionalized polypropylene.

2. A composite material according to claim 1 wherein the functionalized polypropylene is functionalized with maleic anhydride.

3. A composite material according to claim 2 wherein 0.02 to 5.0% of the total weight of said functionalized polypropylene has anhydride functionality.

4. A composite material according to claim 1 further comprising a carboxylic acid sizing agent.

5. A composite material according to claim 4 further comprising carbon black.

6. A composite material according to claim 5 wherein 0.01 to 5.0% of the total weight of said composite material is said carbon black.

7. A composite material according to claim 1 having a DYNATUP impact strength of at least 18 foot-pounds.

8. A composite material according to claim 7 for forming a bumper beam.

9. A composite material according to claim 7 for comprises uni-directional fibers.

10. A composite material according to claim 9 wherein the percentage of said uni-directional fibers in said glass mat is 3 to 100% of the total number of said plurality of glass fibers.

11. A composite material according to claim 1 wherein 15 to 50% of the total weight of said composite material is said glass mat.

12. A composite material according to claim 1 wherein said glass mat is treated with a sizing:
    from about 2 to about 22% of the total weight of said sizing being said polymeric amine;
    from about 2 to about 10% of the total weight of said sizing being said organosilane;
    from about 5 to about 20% of the total weight of said sizing being said film-forming polymer; and
    from about 50 to about 90% of the total weight of said sizing being said emulsified polyolefin.

13. A composite material according to claim 12 wherein said polymeric amine is a polyalkylene polyamine and said organosilane is a compound of the formula

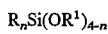

where R is an organic moiety containing an amine-reactable group, $R^1$ is lower alkyl and n is 1 or 2.

14. A composite material according to claim 13 wherein said amine-reactable group is epoxy.

15. A composite material according to claim 13 wherein said polyalkylene polyamine is tetraethylene pentamine and said organosilane is gamma-glycidoxypropyltrimethoxy silane.

16. A composite material comprising:
    chopped glass fibers of at least 0.5 inch in length;
    a functionalized polypropylene;
    carbon black; and
    a substantially peroxide-free sizing agent consisting essentially of a reaction product of a polymeric amine and an organosilane, a film-forming polymer, and an emulsified polyolefin.

17. A composite material according to claim 16 wherein the functionalized polypropylene is functionalized with maleic anhydride.

18. A composite material according to claim 17 wherein 0.02 to 5.0% of the total weight of said functionalized polypropylene has anhydride functionality.

19. A composite material according to claim 16 further comprising a carboxylic acid sizing agent.

20. A composite material according to claim 18 further comprising carbon black and wherein 0.01 to 5.0% of the total weight of said composite material is said carbon black.

21. A composite material according to claim 16 having a DYNATUP impact strength of at least 14 foot-pounds.

22. A composite material according to claim 16 wherein 15 to 50% of the total weight of said composite material is chopped glass fibers.

23. A composite material according to claim 16 wherein said glass mat is treated with a sizing:

from about 2 to about 22% of the total weight of said sizing being said polymeric amine;

from about 2 to about 10% of the total weight of said sizing being said organosilane;

from about 5 to about 20% of the total weight of said sizing being said film-forming polymer; and from about 50 to about 90% of the total weight of said sizing being said emulsified polyolefin.

24. A composite material according to claim 23 wherein said polymeric amine is a polyalkylene polyamine and said organosilane is a compound of the formula $$R_nSi(OR^1)_{4-n}$$

where R is an organic moiety containing an amine-reactable group, $R^1$ is lower alkyl and n is 1 or 2.

25. A composite material according to claim 24 wherein said amine-reactable group is epoxy.

26. A composite material according to claim 24 wherein said polyalkylene polyamine is tetraethylene pentamine and said organosilane is gamma-glycidoxypropyltrimethoxy silane.

27. A bumper beam molded from a composite material comprising:

a glass mat comprising a plurality of glass fibers treated with a reaction product of a polymeric amine and an organosilane, a film-forming polymer and an emulsified polyolefin.

a functionalized polypropylene.

28. A bumper beam according to claim 27 wherein said functionalized polypropylene is functionalized with maleic anhydride.

29. A bumper beam according to claim 28 wherein 0.02 to 5.0% of the total weight of said functionalized polypropylene has anhydride functionality.

30. A bumper beam according to claim 27 further comprising a carboxylic acid sizing agent.

31. A bumper beam according to claim 30 further comprising carbon black.

32. A bumper beam according to claim 27 of generic configuration and having a static crash strength of at least 6,000 pounds.

33. A bumper beam according to claim 27 of domestic van configuration and having a dynamic crash strength of at least 25,000 pounds.

34. A bumper beam according to claim 31 wherein 0.01 to 5.0% of the total weight of said composite material is said carbon black.

35. A bumper beam according to claim 34 wherein said glass mat comprises uni-directional fibers.

36. A bumper beam according to claim 35 wherein the percentage of said uni-directional fibers in said glass mat is 3 to 100% of the total number of said plurality of glass fibers.

37. A bumper beam according to claim 27 wherein 15 to 50% of the total weight of said composite is said glass mat.

38. A bumper beam according to claim 27 wherein said glass mat is treated with a sizing:

from about 2 to about 22% of the total weight of said sizing being polymeric amine;

from about 2 to about 10% of the total weight of said sizing being organosilane;

from about 5 to about 20% of the total weight of said sizing being film-forming polymer; and from about 50 to about 90% of the total weight of said sizing being emulsified polyolefin.

39. A bumper beam according to claim 38 wherein said polymeric amine is a polyalkylene polyamine and said organosilane is a compound of the formula $$R_nSi(OR^1)_{4-n}$$

where R is an organic moiety containing an amine-reactable group, $R^1$ is lower alkyl and n is 1 or 2.

40. A bumper beam according to claim 39 wherein said amine-reactable group is epoxy.

41. A bumper beam according to claim 39 wherein said polyalkylene polyamine is tetraethylene pentamine and said organosilane is gamma-glycidoxypropyltrimethoxy silane.

42. A composite material comprising:

a glass mat comprising a plurality of glass fibers treated with a reaction product of a polymeric amine and an organosilane, a film-forming polymer and an emulsified polyolefin; and a functionalized polypropylene;

wherein said composite has an impact strength of at least 18 foot-pounds according to ASTM test D 3763.

43. A composite material according to claim 42 wherein said functionalized polypropylene is functionalized with maleic anhydride.

44. A composite material according to claim 43 wherein 0.02 to 5.0% of the total weight of said functionalized polypropylene has an anhydride functionality.

45. A composite material according to claim 42 further comprising a carboxylic acid sizing agent.

46. A composite material according to claim 45 further comprising carbon black.

47. A composite material according to claim 46 wherein 0.01 to 5.0% of the total weight of said composite material is said carbon black.

48. A composite material according to claim 47 for forming a bumper beam.

49. A composite material according to claim 48 wherein said glass mat comprises uni-directional fibers.

50. A composite material according to claim 49 wherein the percentage of said uni-directional fibers in said glass mat is 3 to 100% of the total number of said plurality of glass fibers.

51. A composite material according to claim 42 wherein 15 to 50% of the total weight of said composite material is said glass mat.

52. A composite material according to claim 42 wherein said glass mat is treated with a sizing:

from about 2 to about 22% of the total weight of said sizing being said polymeric amine;

from about 2 to about 10% of the total weight of said sizing being said organosilane;

from about 5 to about 20% of the total weight of said sizing being said film-forming polymer; and from about 50 to about 90% of the total weight of said sizing being said emulsified polyolefin.

53. A composite material according to claim 52 wherein said polymeric amine is a polyalkylene polyamine and said organosilane is a compound of the formula $$R_nSi(OR^1)_{4-n}$$

where R is an organic moiety containing an amine-reactable group, $R^1$ is lower alkyl and n is 1 or 2.

54. A composite material according to claim 52 wherein said amine-reactable group is epoxy.

55. A composite material according to claim 52 wherein said polyalkylene polyamine is tetraethylene pentamine and said organosilane is gamma-glycidoxypropyltrimethoxy silane.

56. A laminated composite product comprising:

a first layer of functionalized polyolefin;

a plurality of glass fibers treated with a reaction product of a polymeric amine and an organosilane, a film-forming polymer and an emulsified polyolefin, said plurality of glass fibers brought into contact with said first layer of functionalized polyolefin; and a second layer of functionalized polyolefin brought into contact with said plurality. Of glass fibers, said first layer of functionalized polyolefin, said plurality of glass fibers and said second layer of functionalized polyolefin laminated together by applying pressure and heat to said first layer of functionalized polyolefin, said plurality of glass fibers and said second layer of functionalized polyolefin and cooling said laminated composite product to ambient temperature.

57. A laminated composite product comprising:

a first layer of functionalized polyolefin;

a glass mat comprising a plurality of glass fibers treated with a reaction product of a polymeric amine and an organosilane, a film-forming polymer and an emulsified polyolefin, said glass mat having a first side and a second side, said first side in contact with said first layer of functionalized polyolefin; and a second layer of functionalized polyolefin in contact with said second side of said glass mat, said laminated composite product formed by heating and applying pressure to said second layer of functionalized polyolefin, said glass mat and said first layer of functionalized polyolefin.

58. A glass reinforced resin sheet comprising:

a glass fiber mat treated with a reaction product of a polymeric amine and sn organosilane, a film-forming polymer and an emulsified polyolefin; and a functionalized polyolefin.

59. A resin sheet according to claim 58 further comprising a polyolefin.

60. A resin sheet according to claim 58 further comprising carbon black.

61. A resin sheet according to claim 60 wherein 0.01 to 5.0% of the total weight of said resin sheet is carbon black.

62. A resin sheet according to claim 58 wherein said functionalized polyolefin is polypropylene.

63. A resin sheet according to claim 62 wherein said functionalized polypropylene is functionalized with maleic anhydride.

64. A resin sheet according to claim 62 wherein 0.02 to 5.0% of the total weight of said functionalized polypropylene has an anhydride functionality.

65. A resin sheet according to claim 58 further comprising a carboxylic acid sizing agent.

66. A laminated composite product according to claim 57 further comprising:

a second glass mat treated with a reaction product of a polymeric amine and an organosilane, a film-forming polymer and an emulsified polyolefin, said second glass mat having a first side and a second side, said first side in contact with said second layer of functionalized polyolefin;

a third layer of functionalized polyolefin in contact with said second side of said second glass mat, said laminated composite product formed by heating and applying pressure to said first layer of functionalized polyolefin, said glass mat, said second layer of functionalized polyolefin, said second glass mat and said third layer of functionalized polyolefin.

\* \* \* \* \*

UNITED STATES PATENT AND TRADEMARK OFFICE
CERTIFICATE OF CORRECTION

PATENT NO. : 5,643,989
DATED : July 1, 1997
INVENTOR(S) : Hendrick T. Van de Grampel et al.

It is certified that error appears in the above-identified patent and that said Letters Patent is hereby corrected as shown below:

In the Claims:

Claim 9, column 16 line 10, change "claim 7" to -- claim 8 --.

Claim 56, column 19 line 13, change "said plurality. Of glass" to -- said plurality of glass --.

Claim 58, column 20 line 3, change "sn organosilane" to -- an organosilane --.

Claim 66, column 20, line 36, change "third layer of functionalized polyolefin." to -- third layer of functionalized polyolefin and cooling said laminated composite product to ambient temperature. --.

Signed and Sealed this

Second Day of January, 2001

Attest:

Attesting Officer

Q. TODD DICKINSON
Commissioner of Patents and Trademarks